United States Patent
Kang

(10) Patent No.: US 9,361,282 B2
(45) Date of Patent: Jun. 7, 2016

(54) METHOD AND DEVICE FOR USER INTERFACE

(75) Inventor: Donghyun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 14/119,801

(22) PCT Filed: May 24, 2011

(86) PCT No.: PCT/KR2011/003794
§ 371 (c)(1),
(2), (4) Date: Nov. 22, 2013

(87) PCT Pub. No.: WO2012/161359
PCT Pub. Date: Nov. 29, 2012

(65) Prior Publication Data
US 2014/0088970 A1  Mar. 27, 2014

(51) Int. Cl.
*G10L 13/00* (2006.01)
*G06F 17/24* (2006.01)
*G06F 3/16* (2006.01)
*G10L 13/08* (2013.01)

(52) U.S. Cl.
CPC .............. *G06F 17/24* (2013.01); *G06F 3/167* (2013.01); *G10L 13/08* (2013.01)

(58) Field of Classification Search
CPC ......... G10L 13/08; G10L 13/04; G10L 13/10; G10L 15/22; G10L 15/30; G10L 15/256
USPC .......................... 704/260, 275, 270, 235, 256
See application file for complete search history.

(56) References Cited

U.S. PATENT DOCUMENTS

| 6,064,965 | A | * | 5/2000 | Hanson | 704/275 |
| 6,182,046 | B1 | | 1/2001 | Ortega et al. | |
| 6,804,644 | B1 | * | 10/2004 | Janek et al. | 704/235 |
| 2001/0018653 | A1 | * | 8/2001 | Wutte | 704/256 |
| 2002/0046032 | A1 | * | 4/2002 | Wutte | 704/270 |
| 2002/0143544 | A1 | * | 10/2002 | Gschwendtner | 704/260 |
| 2004/0083109 | A1 | | 4/2004 | Halonen et al. | |
| 2004/0138881 | A1 | * | 7/2004 | Divay et al. | 704/231 |
| 2007/0089070 | A1 | * | 4/2007 | Jaczyk | 715/816 |
| 2009/0313020 | A1 | | 12/2009 | Koivunen | |
| 2010/0275160 | A1 | * | 10/2010 | Im | 715/810 |
| 2010/0312547 | A1 | | 12/2010 | Van Os et al. | |
| 2011/0115702 | A1 | | 5/2011 | Seaberg | |

* cited by examiner

*Primary Examiner* — Leonard Saint Cyr
(74) *Attorney, Agent, or Firm* — Birch, Stewart, Kolasch & Birch, LLP

(57) ABSTRACT

A method for user interface according to one embodiment of the present invention comprises the steps of: displaying text on a screen; receiving a character selection command of a user who selects at least one character included in a text, receiving a speech command of a user who designates a selected range in the text including at least one character, specifying the selected range according to the character selection command and the speech command; and a step for receiving an editing command of a user for the selected range.

8 Claims, 14 Drawing Sheets

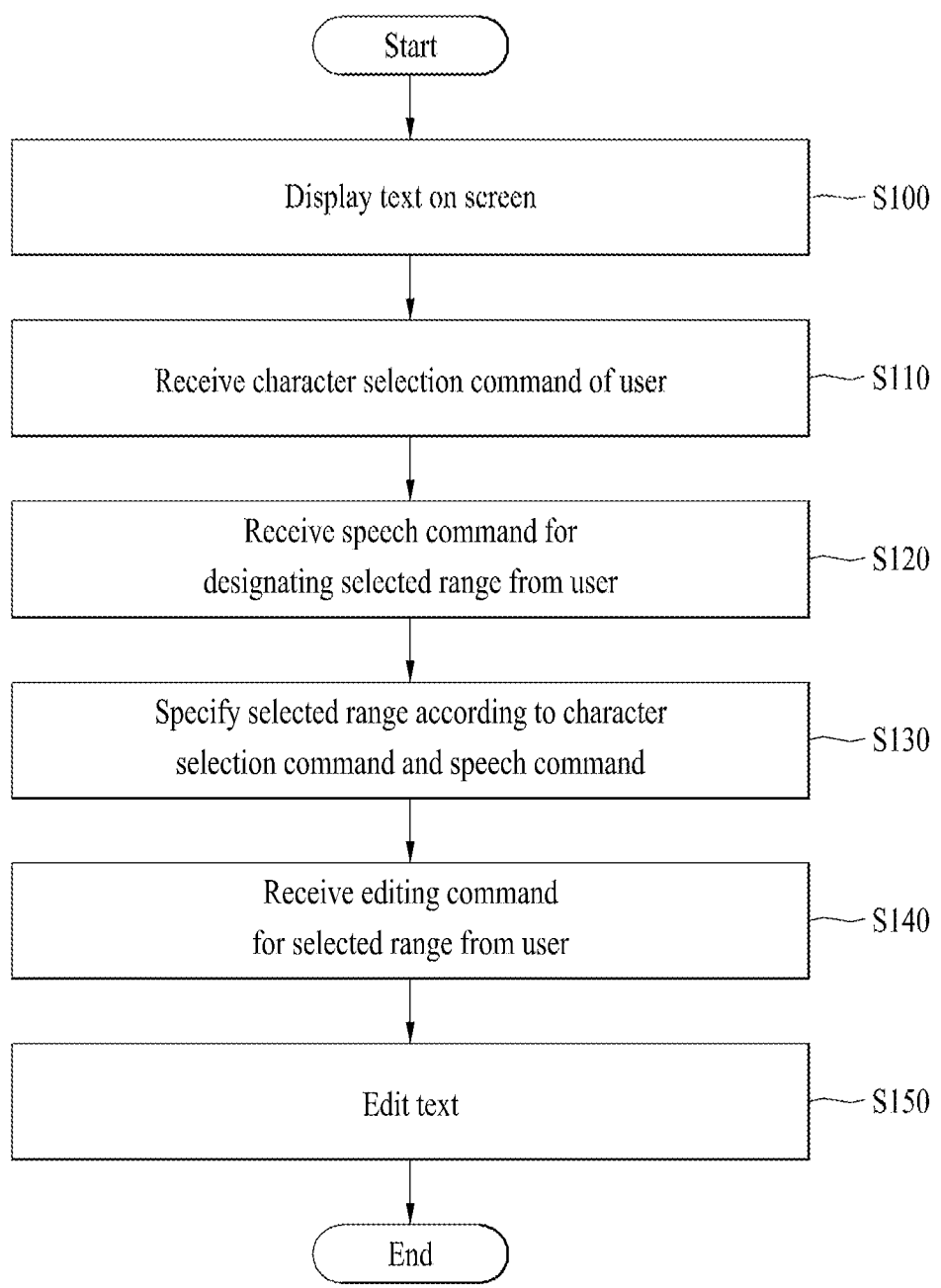

FIG. 2

Peter Piper picked a peck of pickled peppers. A peck of pickled peppers Peter Piper picked. If Peter Piper picked a peck of pickled peppers, Where's the peck of pickled peppers Peter Piper picked?

This person sets information-systems policies, procedures, and technical standards and acts as a liaison between Information Services and other management departments.

We provide kayaks, paddles, spray skirts, lifejackets, charts & compasses, stoves & cooking utensils, safety equipment, radio, flares, first aid supplies, tents (2-person), and delicious wholesome food.

There is also less water to sweat off, and because sweating is how a body cools itself a dehydrated person will be hotter.

Peter Piper picked a peck of pickled peppers. A peck of pickled peppers Peter Piper picked. If Peter Piper picked a peck of pickled peppers, Where's the peck of pickled peppers Peter Piper picked?

This person sets information-systems policies, procedures, and technical standards and acts as a liaison between Information Services and other management departments.

We provide kayaks, paddles, spray skirts, lifejackets, charts & compasses, stoves & cooking utensils, safety equipment, radio, flares, first aid supplies, tents (2-person), and delicious wholesome food.

There is also less water to sweat off, and because sweating is how a body cools itself a dehydrated person will be hotter.

FIG. 6

Peter Piper picked a peck of pickled peppers. A peck of pickled peppers
Peter Piper picked. If Peter Piper picked a peck of pickled peppers,
Where's the peck of pickled peppers Peter Piper picked?

This person sets information-systems policies, procedures, and technical standards and acts as a liaison between Information Services and other management departments.

We provide kayaks, paddles, spray skirts, lifejackets, charts & compasses, stoves & cooking utensils, safety equipment, radio, flares, first aid supplies, tents (2-person), and delicious wholesome food.

There is also less water to sweat off, and because sweating is how a body cools itself a dehydrated person will be hotter.

Sentence!

FIG. 7

Peter Piper picked a peck of pickled peppers. A peck of pickled peppers Peter Piper picked. If Peter Piper picked a peck of pickled peppers, Where's the peck of pickled peppers Peter Piper picked?

This person sets information-systems policies, procedures, and technical standards and acts as a liaison between Information Services and other management departments.

We provide kayaks, paddles, spray skirts, lifejackets, charts & compasses, stoves & cooking utensils, safety equipment, radio, flares, first aid supplies, tents (2-person), and delicious wholesome food.

There is also less water to sweat off, and because sweating is how a body cools itself a dehydrated person will be hotter.

Copy!

FIG. 9
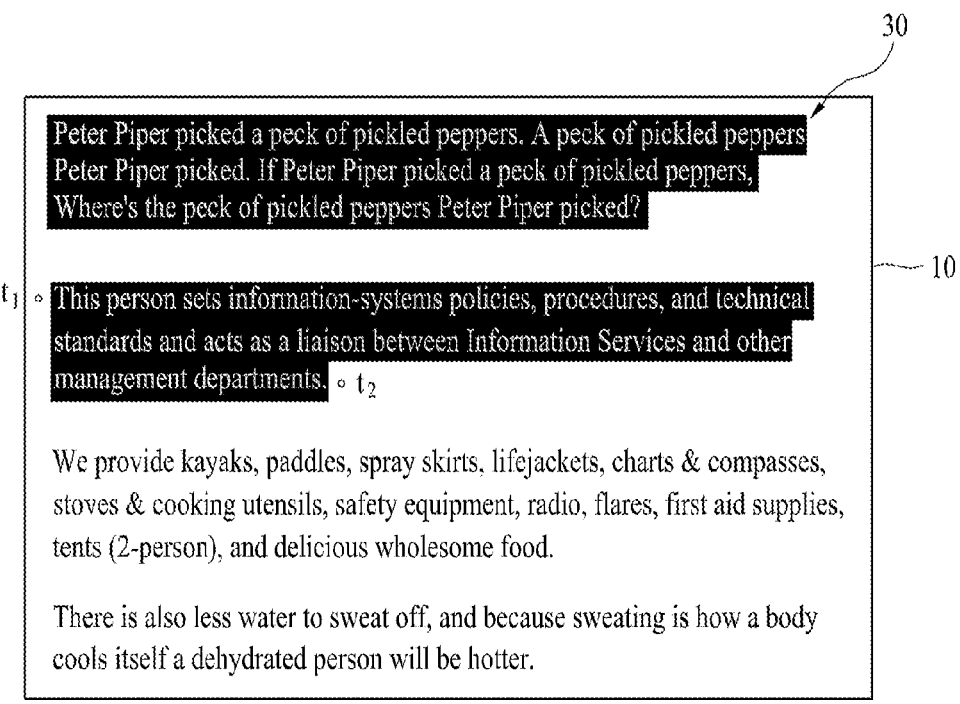
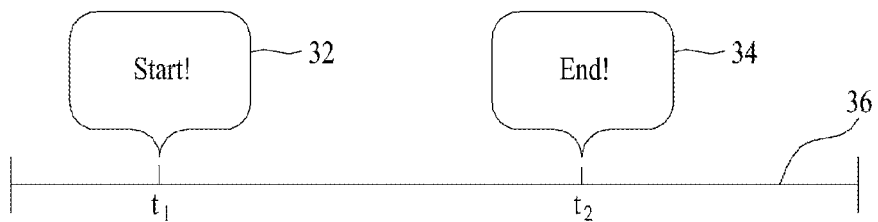

FIG. 10

Peter Piper picked a peck of pickled peppers. A peck of pickled peppers Peter Piper picked. If Peter Piper picked a peck of pickled peppers, Where's the peck of pickled peppers Peter Piper picked?

This person sets information-systems policies, procedures, and technical standards and acts as a liaison between Information Services and other management departments. ←—38

We provide kayaks, paddles, spray skirts, lifejackets, charts & compasses, stoves & cooking utensils, safety equipment, radio, flares, first aid supplies, tents (2-person), and delicious wholesome food.

There is also less water to sweat off, and because sweating is how a body cools itself a dehydrated person will be hotter.

40

Repeat!

FIG. 11

$t_3$   Peter Piper picked a peck of pickled peppers. A peck of pickled peppers Peter Piper picked. If Peter Piper picked a peck of pickled peppers, Where's the peck of pickled peppers Peter Piper picked?

This person sets information-systems policies, procedures, and technical standards and acts as a liaison between Information Services and other management departments.   $t_4$ We provide kayaks, paddles, spray skirts, lifejackets, charts & compasses, stoves & cooking utensils, safety equipment, radio, flares, first aid supplies, tents (2-person), and delicious wholesome food.

There is also less water to sweat off, and because sweating is how a body cools itself a dehydrated person will be hotter.

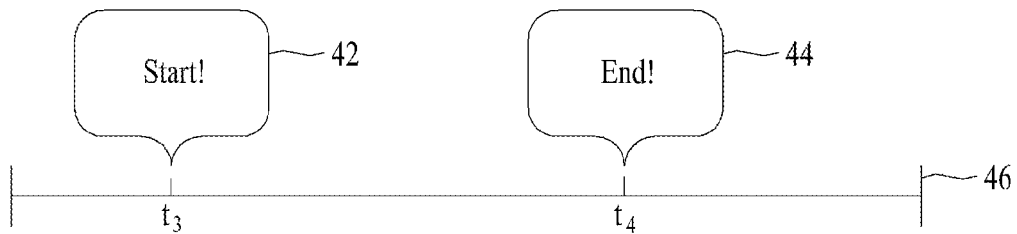

METHOD AND DEVICE FOR USER INTERFACE

TECHNICAL FIELD

The present invention relates to a user interface method and device and, more specifically, to a user interface method and device for easily editing a text using a multimodal interface.

BACKGROUND ART

With the development of speech recognition and speech synthesis, there is a growing need for a multimodal interface which uses an additional input means other than speech, for terminals such as a mobile terminal, home network terminal, robot, etc.

Multimodal is a channel achieved by modeling human sensory channels such as the sense of sight, sense of hearing, sense of taste, sense of smell, etc. with a plurality of modalities and converting the modeled sensory channels through a mechanical device. Interchange of modalities is referred to as a multimodal interaction.

Speech recognition is a process through which a computer maps an acoustic speech signal to text. That is, speech recognition is a process of converting an acoustic signal obtained through a microphone or a telephone into a word, word set or text. A speech recognition result can be used as a final result in applications such as command, control, data input, text preparation, etc. and can be used as an input of a language processing procedure in a field such as speech understanding. Accordingly, speech recognition enables natural communication between peoples and computers and enriches human life.

Speech synthesis refers to automatic generation of speech waveforms using a mechanical device, electronic circuit or computer simulation. TTS (text-to-speech), a speech synthesis technology, converts input text data into speech by mechanically analyzing and processing the input text data.

Publication or information exchange through electronic documents composed of text information is common now. Electronic documents are provided to users through computers, TV receivers or mobile terminals including a display and users edit electronic documents including text information using a mouse, keypad, etc.

DISCLOSURE

Technical Problem

An object of the present invention devised to solve the problem lies in a user interface method and device using a multimodal interface to enable a user to easily edit a text.

Another object of the present invention is to provide a user interface method and device using speech recognition or speech synthesis to enable a user to easily edit a text.

Technical Solution

The object of the present invention can be achieved by providing a user interface method including: displaying a text on a screen; receiving a character selection command for selecting at least one character included in the text from a user; receiving a speech command for designating a selected range of the text including the at least one character from the user; specifying the selected range according to the character selection command and the speech command; and receiving an editing command for the selected range from the user.

The selected range may correspond to a word, phrase, sentence, paragraph or page including the at least one character.

The editing command may correspond to one of a copy command, a cut command, an edit command, a transmit command and a search command for the selected range of the text.

The character selection command may be received through a touch gesture of the user, applied to the at least one character.

The character selection command may be received through movement of a cursor displayed on the screen.

The cursor may be moved by user input using a gesture, keyboard, mouse or wireless remote controller.

The editing command of the user may be received according to user input using speech, touch gesture, gesture, a keyboard, a mouse or a wireless remote controller.

In another aspect of the present invention, provided herein is a user interface method including: performing speech synthesis on a text and outputting the speech-synthesized text as speech; receiving a first speech command indicating the start of a selected range of the text from a user during speech synthesis; receiving a second speech command indicating the end of the selected range of the text from the user during speech synthesis; specifying the selected range according to the first speech command and the second speech command; and receiving an editing command for the selected range from the user.

The user interface method may further include displaying the text on a screen and sequentially highlighting words or sentences of the speech-synthesized text.

The user interface method may further include: performing speech synthesis on the selected range of the text and outputting the selected range as speech; receiving a third speech command indicating the start of a second selected range included in the selected range of the text from the user during speech synthesis; receiving a fourth speech command indicating the end of the second selected range included in the selected range of the text from the user during speech synthesis; and specifying the second selected range according to the third speech command and the fourth speech command.

In another aspect of the present invention, provided herein is a user interface device including: a video output unit for displaying a text on a screen; a first user input unit for receiving a character selection command for selecting at least one character included in the text from a user; a second user input unit for receiving a speech command for designating a selected range in the text including the at least one character from the user; and a controller for receiving the character selection command from the first user input unit, receiving the speech command from the second user input unit and specifying the selected range of the text.

In another aspect of the present invention, provided herein is a user interface device including: a speech rendering module for performing speech synthesis on a text; an audio output unit for outputting synthesized speech data corresponding to the text processed by the speech rendering module; a speech recognition module for recognizing a first speech command of a user for indicating the start of a selected range of the text and a second speech command of the user for indicating the end of the selected range during output of the synthesized speech data; a speech interpretation module for interpreting the first speech command and the second speech command received from the speech recognition module; and a controller for specifying the selected range according to the first speech command and the second speech command interpreted by the speech interpretation module.

Advantageous Effects

According to the present invention, a user can easily edit a text through an intuitive interface.

DESCRIPTION OF DRAWINGS

FIG. 1 is a flowchart illustrating a user interface method according to a first embodiment of the present invention.

FIG. 2 shows a text to be edited.

FIG. 5 illustrates another method through which the user inputs the character selection command.

FIG. 6 illustrates a method through which the user inputs a speech command for designating a selected range of a text in the method of FIG. 5.

FIG. 7 illustrates a method through which the user inputs an editing command for the selected range of the text.

FIG. 9 illustrates a method of designating a selected range of a text according to the second embodiment of the present invention.

FIGS. 10 and 11 illustrate a method for inputting an additional selection command for the selected range of FIG. 9.

BEST MODE

Figure 3:
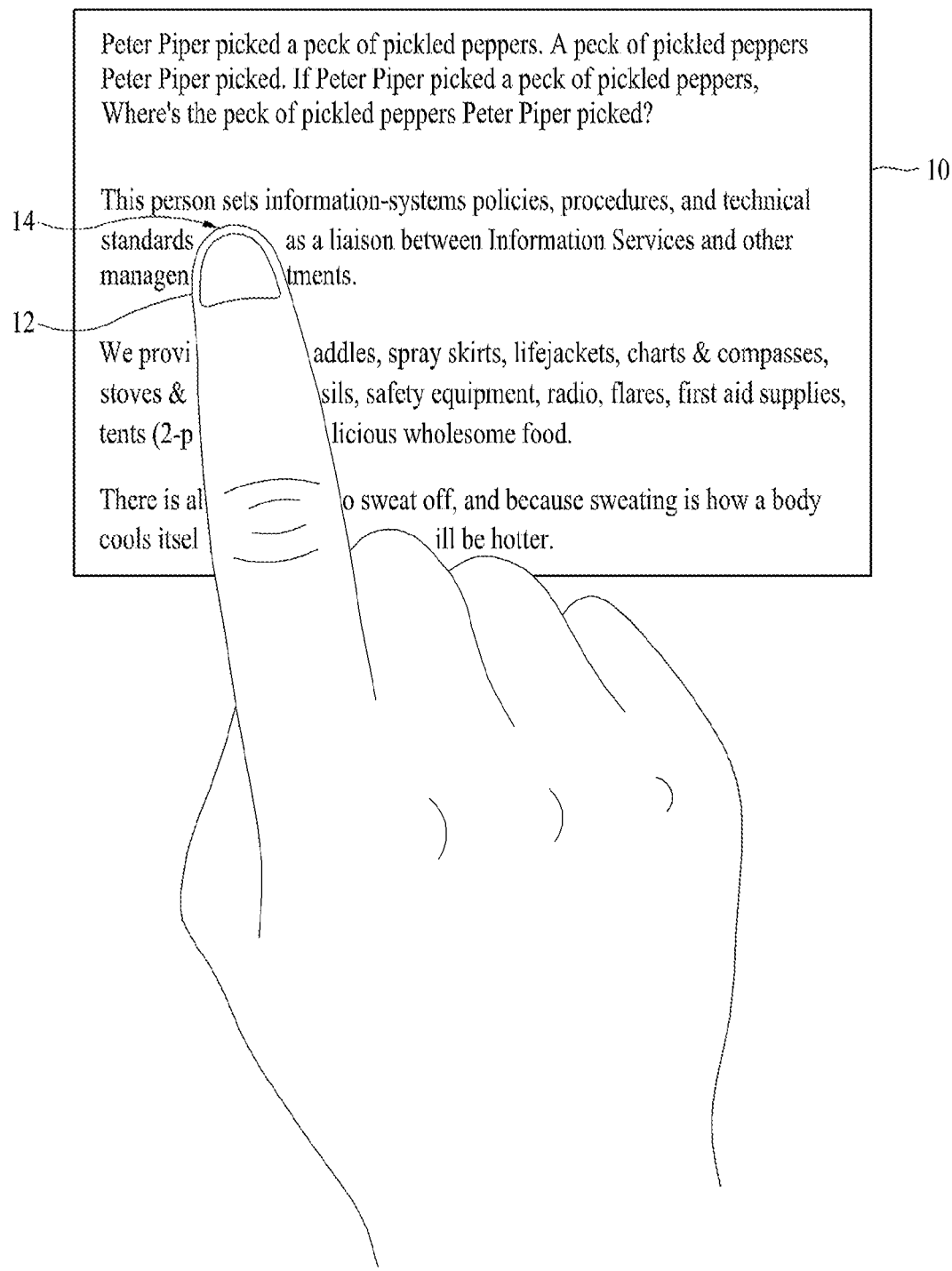
FIG. 3 illustrates a method through which a user selects a character selection command.

A user interface method according to an embodiment of the present invention includes displaying a text on a screen, receiving a character selection command for selecting at least one character included in the text from a user, receiving a speech command for designating a selected range of the text including the at least one character from the user, specifying the selected range according to the character selection command and the speech command, and receiving an editing command for the selected range from the user.

The selected range may correspond to a word, phrase, sentence, paragraph or page including the at least one character.

The editing command may correspond to one of a copy command, a cut command, an edit command, a transmit command and a search command for the selected range of the text.

The character selection command may be received through a touch gesture of the user, applied to the at least one character.

The character selection command may be received through movement of a cursor displayed on the screen.

The cursor may be moved by user input using a gesture, keyboard, mouse or wireless remote controller.

The editing command of the user may be received according to user input using speech, touch gesture, gesture, a keyboard, a mouse or a wireless remote controller.

A user interface method according to another embodiment of the present invention includes performing speech synthesis on a text and outputting the speech-synthesized text as speech, receiving a first speech command indicating the start of a selected range of the text from a user during speech synthesis, receiving a second speech command indicating the end of the selected range of the text from the user during speech synthesis, specifying the selected range according to the first speech command and the second speech command, and receiving an editing command for the selected range from the user.

The user interface method may further include displaying the text on a screen and sequentially highlighting words or sentences of the speech-synthesized text.

The user interface method may further include performing speech synthesis on the selected range of the text and outputting the selected range as speech, receiving a third speech command indicating the start of a second selected range included in the selected range of the text from the user during speech synthesis, receiving a fourth speech command indicating the end of the second selected range included in the selected range of the text from the user during speech synthesis, and specifying the second selected range according to the third speech command and the fourth speech command.

A user interface device according to an embodiment of the present invention includes a video output unit for displaying a text on a screen, a first user input unit for receiving a character selection command for selecting at least one character included in the text from a user, a second user input unit for receiving a speech command for designating a selected range in the text including the at least one character from the user, and a controller for receiving the character selection command from the first user input unit, receiving the speech command from the second user input unit and specifying the selected range of the text.

A user interface device according to another embodiment of the present invention includes a speech rendering module for performing speech synthesis on a text, an audio output unit for outputting synthesized speech data corresponding to the text processed by the speech rendering module, a speech recognition module for recognizing a first speech command of a user for indicating the start of a selected range of the text and a second speech command of the user for indicating the end of the selected range during output of the synthesized speech data, a speech interpretation module for interpreting the first speech command and the second speech command received from the speech recognition module, and a controller for specifying the selected range according to the first speech command and the second speech command interpreted by the speech interpretation module.

MODE FOR INVENTION

Embodiments of the present invention are described in detail with reference to the attached drawings. FIG. 1 is a flowchart illustrating a user interface method according to a first embodiment of the present invention.

Referring to FIG. 1, the user interface method according to the present embodiment includes a step S100 of displaying a text to be edited on a screen 10, a step S110 of receiving a character selection command for selecting at least one character included in the text from a user, a step S120 of receiving a speech command for designating a selected range in the text including the at least one character from the user, a step S130 of specifying the selected range according to the character selection command and the speech command, a step S140 of receiving an editing command for the selected range of the text from the user and a step S150 of performing a corresponding editing function according to the editing command. A detailed description will be given of each step with reference to FIGS. 2 to 7.

Referring to FIG. 2, the text to be edited is displayed on the screen 10 (S100). For example, the screen 10 can include a touchscreen configured to recognize a touch gesture of a user.

Then, the character selection command for selecting at least one character included in the text is received from the user (S110) and the speech command of the user for designating a selected range of the text including the at least one character is received (S120).

Referring to FIG. 3, when the user inputs the character selection command by touching at least one character 14 included in the text to be edited with a finger 12, the character selection command can be received by recognizing the character 14 selected by the user through the touchscreen.

Figure 4:
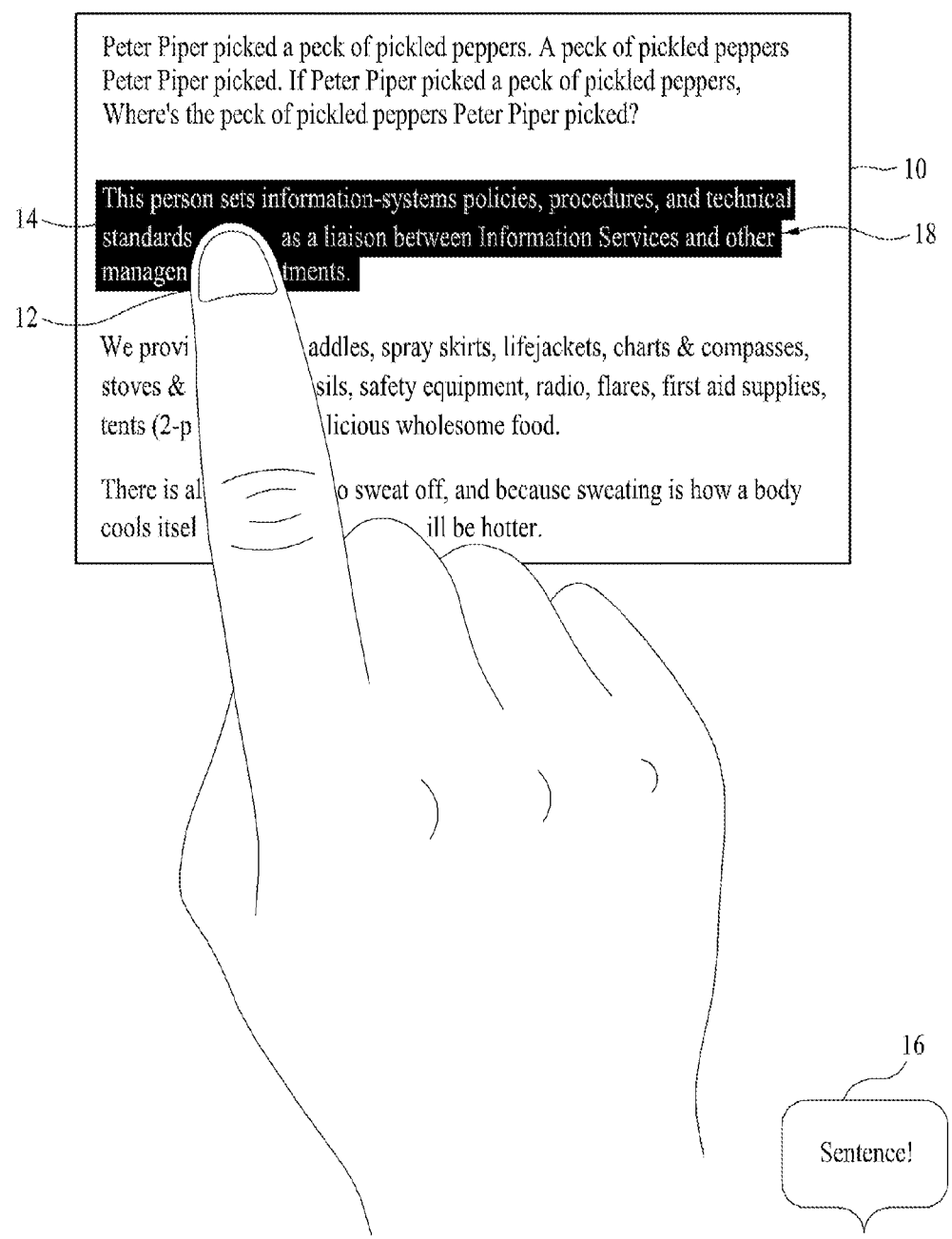
FIG. 4 illustrates a method through which the user inputs a speech command for designating a selected range of a text in the method of FIG. 3.

Referring to FIG. 4, when the user inputs a speech command 16 for designating a selected range of the text while touching the at least one character 14 with the finger 12, the speech command of the user is recognized and interpreted.

While FIG. 4 illustrates input of the speech command 16 for selecting the entire sentence including the character selected by a touch gesture of the user, the user can input a speech command for selecting a word, sentence, paragraph or page including the selected character and the speech command of the user can be received, recognized and interpreted.

Processing according to the received command is performed to designate a selected range 18 of the text (S130). Here, the selected range 18 of the text, designated by the user, can be highlighted such that the user can recognize selection of the text, as shown in FIG. 4.

FIGS. 5 and 6 illustrate designation of the selected range of the text using a cursor 20 displayed on the screen 10 which is not a touchscreen. Referring to FIG. 5, when the user locates the cursor 20 on the at least one character 14 included in the text to be edited through a mouse, wireless remote controller, keypad or gesture input and inputs a selection key, the selection key is recognized to receive a character selection command.

Referring to FIG. 6, when the user locates the cursor 20 on the at least one character 14 and inputs a speech command 21 for designating the selected range of the text to be edited, the speech command 21 of the user is recognized and interpreted.

While FIG. 6 illustrates input of the speech command 21 for selecting the entire sentence including the character selected by the user using the cursor 20, the user can input a speech command for selecting a word, sentence, paragraph or page including the selected character and the speech command of the user is recognized and interpreted to designate the selected range 18 of the text according to the command. Here, the selected range 18 of the text, designated by the user, can be highlighted such that the user can recognize selection of the text, as shown in FIG. 6.

Upon designation of the selected range 18 of the text according to the above-described method, the user inputs an editing command for the selected range 18 of the text. Here, the user can instruct various processes to be performed on the text, such as copy, cut, edit, transmit and search, through speech input.

FIG. 7 illustrates input of a copy command for the selected range of the text through speech input of the user. The speech input of the user, which corresponds to the copy command, is received, recognized, interpreted and delivered and the copy command is executed.

However, an editing command 22 corresponding to the above-described copy command can be input through any available input means such as a user gesture, mouse, wireless remote controller or keypad in addition to the speech input.

The user may input a transmission command through e-mail, text message or SNS using the above-described input means.

According to the user interface method of the first embodiment of the present invention, the user can designate the selected range 18 of the text to be edited rapidly and correctly using an input through a touch gesture or the cursor 20 and a speech input and thus can efficiently edit the text.

A description will be given of a user interface method according to a second embodiment of the present invention with reference to FIGS. 8 to 11. In the user interface method according to the present embodiment, when text is converted into speech through speech synthesis and output as speech, a selected range of the text is designated through a speech input of the user and the selected range is edited.

Figure 8:
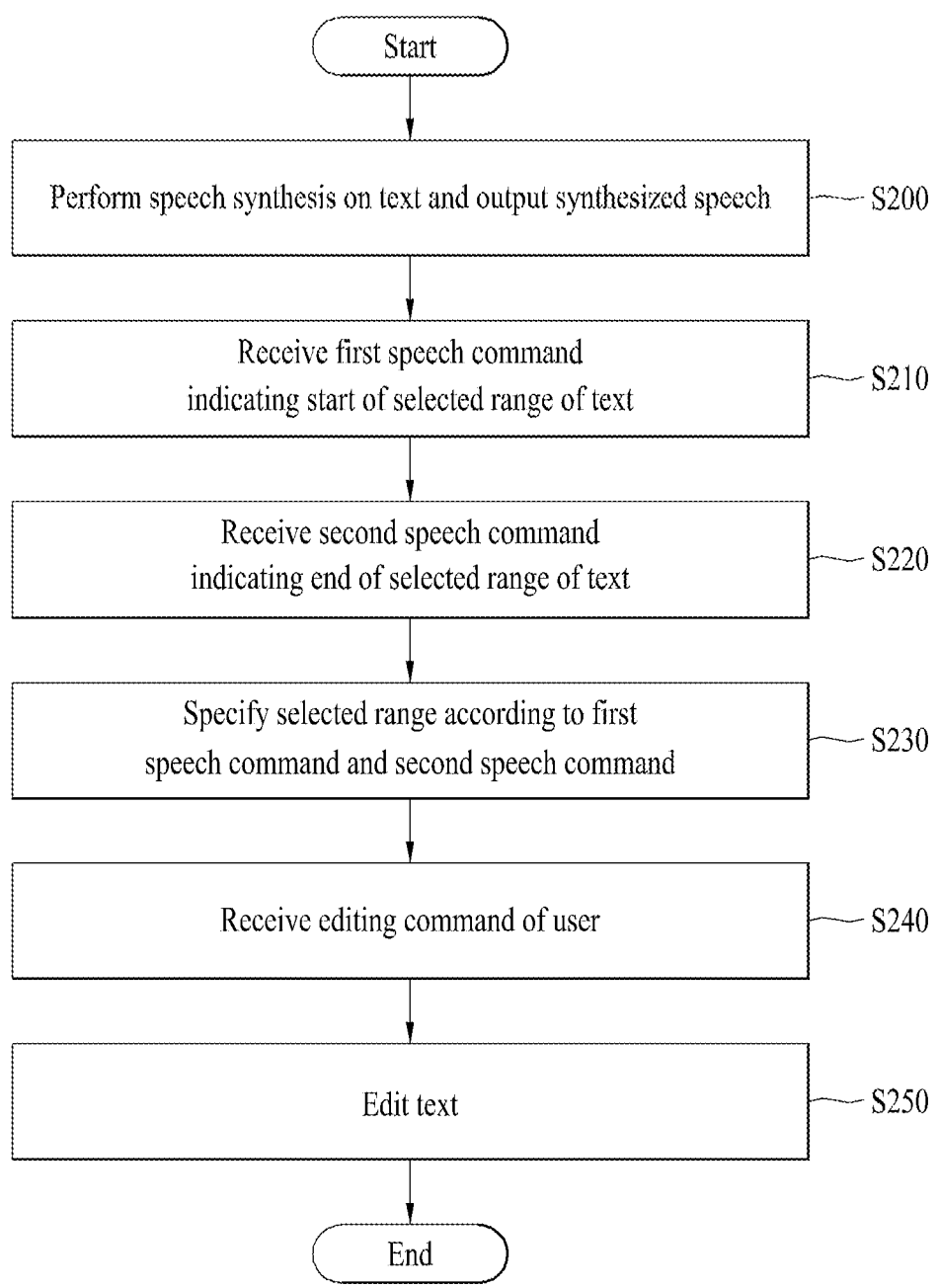
FIG. 8 is a flowchart illustrating a user interface method according to a second embodiment of the present invention.

Referring to FIG. 8, the user interface method according to the second embodiment includes a step S200 of performing speech synthesis on a text and outputting synthesized speech, a step S210 of receiving a first speech command 32 indicating the start of a selected range of the text from the user during the speech synthesis step, a step S220 of receiving a second speech command 34 indicating the end of the selected range of the text from the user during the speech synthesis step, a step S230 of specifying the selected range of the text according to the first speech command 32 and the second speech command 34, a step S240 of receiving an editing command for the selected range from the user and a step S250 of editing the text.

Each step will now be described in detail with reference to FIGS. 9, 10 and 11.

Speech synthesis is performed on the text and synthesized speech is output (S210). Here, speech-synthesized words or phrases 30 can be sequentially highlighted and displayed according to an application, as shown in FIG. 9. Accordingly, the user can visually recognize the currently speech-synthesized portion of the text.

During the speech synthesis step, the first speech command 32 indicating the start of the selected range of the text is received from the user (S210) and the second speech command 34 indicating the end of the selected range of the text is received from the user (S220).

The user can input the first speech command 32 at the time when the start of the selected range of the text is output during speech synthesis. For example, when the user wants to select a sentence of the speech-synthesized text, the user can input the first speech command 32 through speech input of "start" at time t1 when the start of the sentence is output, as illustrated in FIG. 9. The speech input of the user can be received, recognized as a word "start" and interpreted as a command for designating the start of the selected range of the text.

In addition, the user can input the second speech command 34 through speech input of "end" at time t2 when the end of the sentence is output. Here, a speech recognition module 102 can recognize the speech input of the user as a word "end" and interpret the same as a command for designating the end of the selected range of the text.

The first and second speech commands 32 and 34 of the user are mapped to corresponding text information according to a time base 36 indicating speech synthesis output time of the text.

Accordingly, as shown in FIG. 10, the selected range 38 of the speech synthesis text can be specified by the first and second speech commands 32 and 34 of the user and the specified selected range 38 can be highlighted.

The user interface method according to the present embodiment can further include an additionally selected range designation step for designating a selected range of a text more accurately. Referring to FIG. 10, the user can input a speech command 40 for repeating output of the selected range of the text as speech. The speech command 40 of the user can be recognized as a word "repeat" and interpreted as a command for repeating output of the selected range of the text as speech.

During output of the selected range 38 of the text according to the first and second speech commands 32 and 34 of the user, the user inputs a third speech command 42 and a second speech command 44 for specifying a second selected range 41 included in the above-described selected range 38.

The user can input the third speech command 42 at the time when the start of the selected range 41 is output as speech during speech synthesis of the selected range 41. For example, when the user wants to select a portion including a plurality of words from the speech-synthesized text, the user can input the third speech command 42 through speech input of "start" at time t3 when the start of the portion is output, as shown in FIG. 11. The speech input of the user can be received, recognized as a word "start" and interpreted as a command for designating the start of the second selected range 41 of the text.

The user can input the second speech command 34 through speech input of "end" at time t4 when the end of the portion is output. The speech input of the user can be recognized as a word "end" and interpreted as a command for designating the end of the second selected range 41.

An editing command for the selected range of the text is received from the user and executed (S250). This step can be performed in the same manner as the first embodiment and thus detailed description thereof is omitted.

In the user interface method according to the second embodiment of the present invention, the user can designate the selected range of the text to be edited using only speech without operating an additional input unit and thus can efficiently edit the text.

A description will be given of a user interface device according to an embodiment of the present invention with reference to FIGS. 12, 13 and 14. The user interface device according to the present embodiment can be configured to implement the user interface methods according to the first and second embodiments of the present invention.

Figure 12:
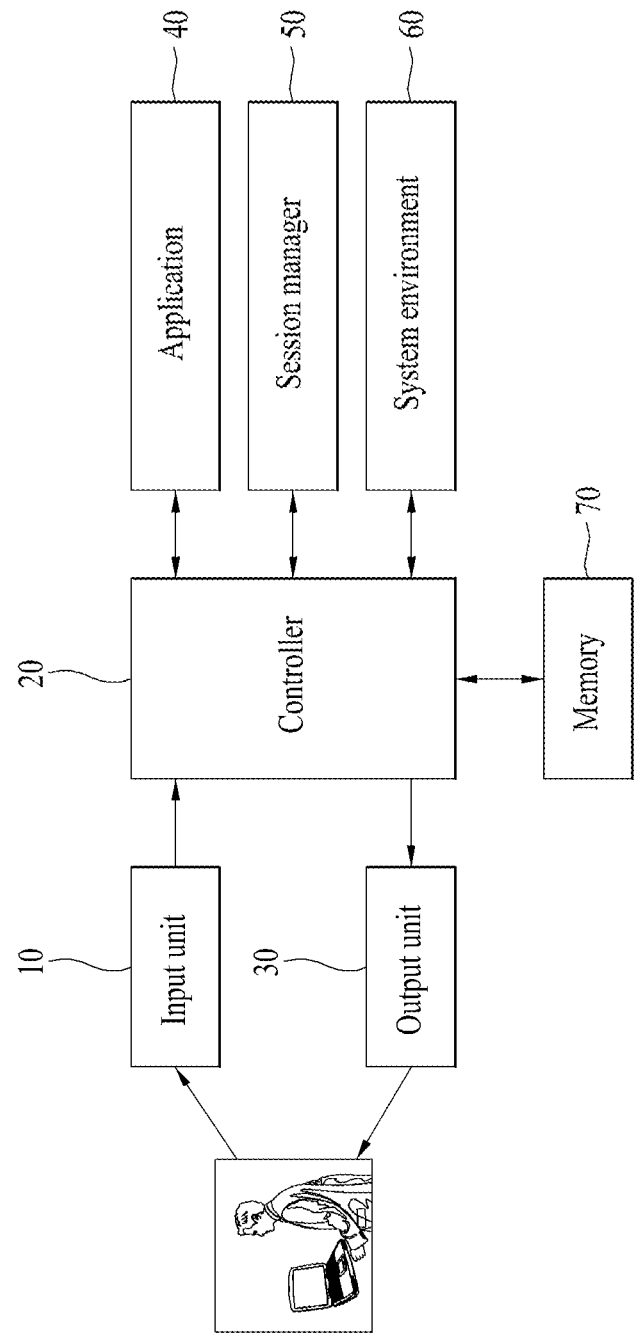
FIG. 12 is a block diagram illustrating a user interface device according to an embodiment of the present invention.

FIG. 12 is a block diagram illustrating the user interface device according to the present embodiment of the invention. Referring to FIG. 12, the user interface device includes an input unit 10, a controller 20, an output unit 30, an application unit 40, a session manager 50, a system environment 60 and a memory 70.

The input unit 10 can be configured to provide various input modes such as audio, speech, touch gesture, gesture, keyboard, mouse, etc. and the output unit 30 can be configured to provide various output modes such as speech, text, graphics, audio, etc.

However, the present invention is not limited thereto and an additional input or output mode may be added or an input or output mode may be excluded from the above-described input or output modes. Detailed configurations of the input unit 10 and the output unit 30 will be described below in detail with reference to FIGS. 13 and 14.

The controller 20 executes an application service using information obtained from the input unit 10 and provides the execution result to the output unit 30.

The session manager 50 manages sessions with various terminals and multimodal application services and executes a synchronization function for outputs of various terminals.

The system environment 60 provides information about variations in terminals and user environments to the controller 20 such that the controller 20 can recognize and cope with the variations.

Figure 13:
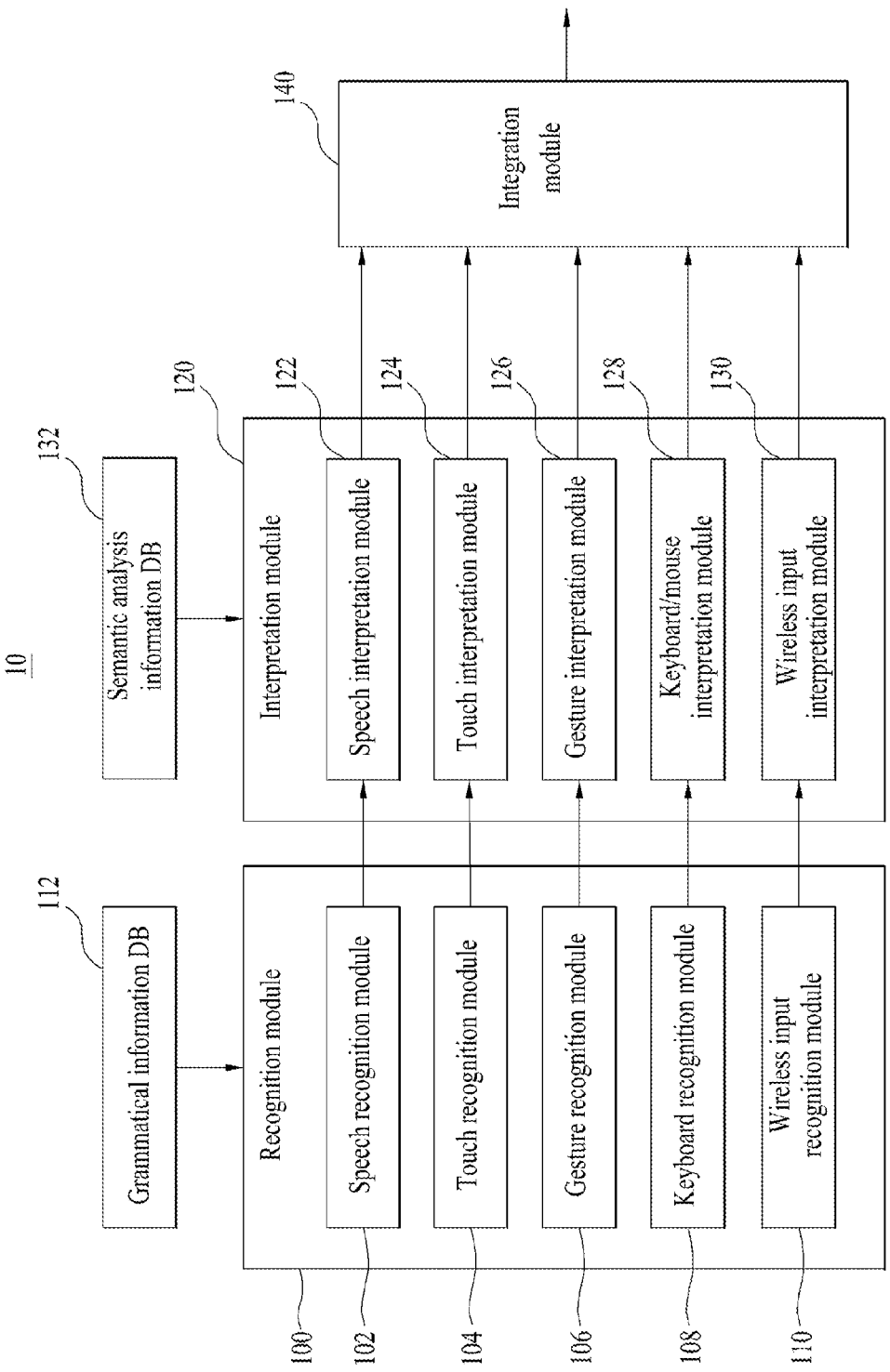
FIG. 13 is a block diagram illustrating an input unit shown in FIG. 12.
Figure 14:
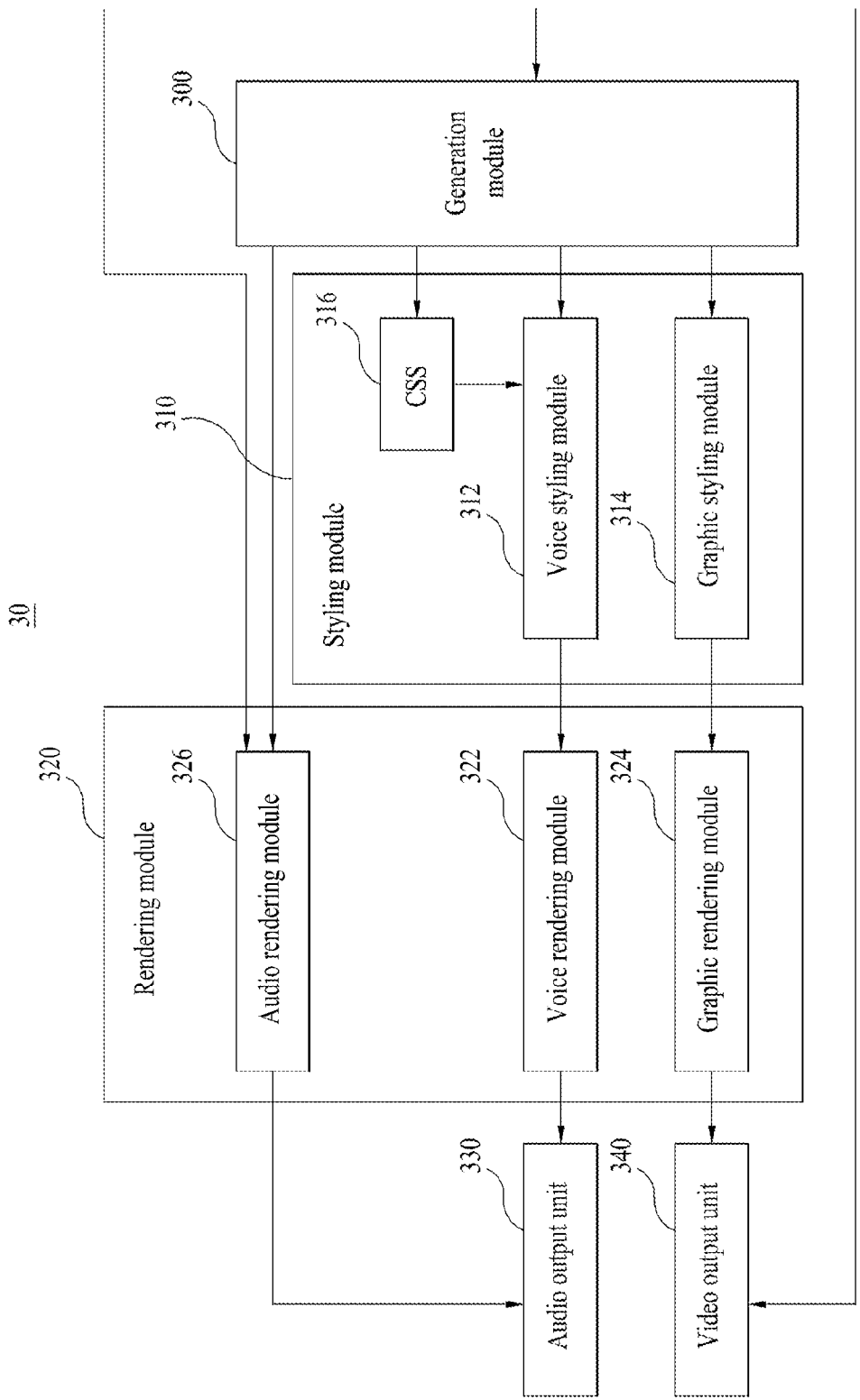
FIG. 14 is a block diagram illustrating an output unit shown in FIG. 12.

FIG. 13 is a block diagram illustrating the input unit 10 of the user interface device. Referring to FIG. 13, the input unit 10 includes a recognition module 100, an interpretation module 120 and an integration module 140.

The recognition module 100 recognizes a user input through a multimodal interface using grammatical information stored in a grammatical information DB 112 and converts the user input into an information form that can be easily interpreted. More specifically, the recognition module 100 may include a speech recognition module 102, a touch recognition module 104, a gesture recognition module 106, a keyboard recognition module 108 and a wireless input recognition module 110.

The speech recognition module 102 converts user speech into text. Here, the speech recognition module 102 can convert user speech into text using an acoustic model, language model and W3C speech recognition grammar or a grammar such as a stochastic language model, stored in the grammatical information DB 112.

The touch recognition module 104 detects a touch gesture of a user through a touchscreen and outputs the detected touch gesture.

The gesture recognition module 106 recognizes a gesture input of a user using a camera and outputs the recognized input.

The keyboard recognition module 108 converts a key input of a user into characters.

The wireless input recognition module 110 recognizes user input through a wireless remote controller.

The interpretation module 120 interprets information recognized by the recognition module 100 as a meaning intended by a user according to semantic analysis information stored in a semantic analysis information DB 132. For example, the interpretation module 120 converts "yes", "yeah", "yep", etc. into "yes". Output data of the interpretation module 120 can be converted into an extended multimodal annotation language (EMMA), a kind of a language representing the meaning of data, and input to the integration module 140.

The interpretation module 120 may include a speech interpretation module 122, a touch interpretation module 124, a gesture interpretation module 126, a keyboard interpretation module 128 and a wireless input interpretation module 130, which respectively correspond to the speech recognition module 102, touch recognition module 104, gesture recognition module, keyboard recognition module 108 and wireless input recognition module 110 included in the recognition module 100.

The integration module 140 integrates various inputs from the interpretation module 120 and transmits the integrated inputs to the controller 20.

The recognition module 100, interpretation module 120 and integration module 140 of the input unit 10 can be separated or integrated. Particularly, the integration module 140 may be implemented as part of the controller 20 as necessary.

The output unit 30 will now be described with reference to FIG. 14. Referring to FIG. 14, the output unit 30 includes a generation module 300, a styling module 310, a rendering module 320, an audio output unit 330 and a video output unit 340.

The generation module 300 determines an output mode of information to be delivered to a user, such as a voice or graphics mode, upon input of the information from the controller 20. The generation module 300 may determine a single output mode or a plurality of complementary output modes. The generation module 300 may be integrated with the controller 20, differently from the configuration shown in FIG. 14.

The styling module 310 adds information about how information is represented. The styling module 310 may include a voice styling module 312 and a graphic styling module 314.

The voice styling module 312 can configure a text string including a speech synthesis markup language (SSML) tag that indicates how a word is pronounced. In addition, the voice styling module 312 can add information about spacing between words of a text to be speech-synthesized. Here, the voice styling module 312 can correct speech output using cascading style sheets (CSS) 316.

The graphic styling module 314 generates and outputs information regarding how graphics are located on the screen 10. For example, the graphic styling module 314 can generate the information using XHTML (extensible hyper text markup language), XHTML Basic, SVG (scalable vector graphics) markup tag, etc.

The rendering module 320 converts information generated by the styling module 310 into a format that can be easily understood by the user. The rendering module 320 includes a voice rendering module 322 for performing speech synthesis on a character string output from the voice styling module 312 and outputting synthesized speech, a graphic rendering module 324 for converting information output from the graphic styling module 314 into graphics displayed to the user and outputting the graphics, and an audio rendering module 326 for processing audio data for the user interface. The audio data can be directly output from the controller 20 to the audio rendering module 326 without being processed by the generation module 300.

The audio output unit 330 outputs audio data generated in the voice rendering module 322 and the audio rendering module 326 to the user.

The video output unit 340 outputs graphics processed by the graphic rendering module 320 and video data processed by the controller 20 to the user. As described above, the video output unit 340 may include a touchscreen.

A description will be given of operations of the above-described user interface device according to an embodiment of the present invention. Implementation of the user interface method according to the first embodiment of the present invention by the above-described user interface device will now be described in detail. As shown in FIG. 2, a text to be edited is displayed on the screen 10 of the video output unit 340.

The touch recognition module 104 receives a character selection command for selecting at least one character included in the text from the user and the speech recognition module 102 receives a speech command for designating a selected range of the text including the at least one character from the user.

Referring to FIG. 3, when the user touches at least one character 14 included in the text to be edited with the finger 14, the touch recognition module 102 recognizes the touch and the touch interpretation module 124 interprets the touch as a character selection command and delivers the character selection command to the integration module 140.

Referring to FIG. 4, when the user inputs the speech command 16 for designating the selected range of the text while touching the at least one character 14 with the finger 12, the speech recognition module 100 recognizes the speech command of the user and delivers the speech command to the speech interpretation module 120 which interprets the speech command.

While FIG. 4 illustrates input of the speech command 16 for selecting the entire sentence including the character selected by touch gesture of the user, the user can input a speech command for selecting a word, sentence, paragraph or page including the selected character and the speech interpretation module 120 can grasp the meaning of the speech command of the user and deliver the meaning of the speech command to the integration module 140.

The integration module 140 integrates the character selection command according to the received touch gesture and the selected range designation command according to the speech command and delivers the integrated command to the controller 20. The controller 20 performs processing according to the command received from the integration module 140 to designate the selected range 18 of the text. Here, the controller 20 can control the video output unit 340 to highlight the selected range of the text, designated by the user, as shown in FIG. 4.

Referring to FIG. 5, when the user locates the cursor 20 on the at least one character 14 included in the text to be edited through a mouse, wireless remote controller, keypad or gesture input and inputs a selection key, the wireless input recognition module 110 recognizes the selection key and outputs the recognition result to the wireless input interpretation module 130. The wireless input interpretation module 130 interprets the selection key as a character selection command and delivers the character selection command to the integration module 140.

Referring to FIG. 6, when the user locates the cursor 20 on the at least one character 14 and inputs a speech command 21 for designating the selected range of the text to be edited, the speech recognition module 100 recognizes the speech command of the user and outputs the same to the speech interpretation module 120. The speech interpretation module 120 interprets the speech command 21.

While FIG. 6 illustrates input of the speech command 21 for selecting the entire sentence including the character selected by the user using the cursor 20, the user can input a speech command for selecting a word, sentence, paragraph or page including the selected character and the speech interpretation module 120 can interpret the speech command and deliver the interpretation result to the integration module 140.

Upon designation of the selected range 18 of the text according to the above-described method, the user inputs an editing command for the selected range 18 of the text. Here, the user can instruct various processes to be performed on the text, such as copy, cut, edit, transmit and search, through speech input. The speech recognition module 102 and the speech interpretation module 122 recognize the speech command of the user, interpret the same as an editing command and deliver the editing command to the integration module 140.

FIG. 7 illustrates input of a copy command 22 for the selected range of the text through a speech input of the user. Here, the speech recognition module 100 recognizes the speech input of the user and delivers the speech input to the speech interpretation module 120. The speech interpretation module 120 interprets the speech input as a copy command and delivers the copy command to the integration module 140. The integration module 140 outputs the copy command to the controller 20 which executes the interpreted copy command.

An editing command 22 corresponding to the above-described copy command can be input through any available input means such as a user gesture, mouse, wireless remote controller or keypad in addition to the speech input. Here, a user gesture is recognized and interpreted by the gesture recognition module 106 and gesture interpretation module 126, input through a keyboard is recognized and interpreted by the keyboard recognition module 108 and keyboard interpretation module 128 and input through a wireless remote controller is recognized and interpreted by the wireless input recognition module 110 and wireless input interpretation module 130.

A description will be given of implementation of the user interface method according to the second embodiment of the present invention by operations of the above-described user interface device.

When the generation module 300 selects a speech output mode, the voice styling module 312 generates character string information that represents how the text is pronounced and delivers the character string information to the voice rendering module 322. The voice rendering module 322 performs speech synthesis on the text based on the character string information. The speech-synthesized text is output to the user through the audio output unit 330. Here, speech-synthesized words or phrases 30 can be highlighted according to application, as shown in FIG. 9. In this case, the generation module 300 selects a graphic output mode along with the speech output mode. The graphic styling module 314 generates information regarding text position and highlighting and outputs the information to the graphic rendering module 320. The graphic rendering module 320 converts the text into graphics according to the information generated by the graphics styling module 314. The graphics are output to the user through the video output unit 340.

During speech synthesis processing, the speech recognition module 100 recognizes the first speech command 32 and the second speech command 34 of the user on the basis of the grammar information 112 and delivers the first and second speech commands 32 and 34 to the speech interpretation module 120. The speech interpretation module 120 respectively interprets the first speech command 32 and the second speech command 34 as the start and end of a selected range of the text on the basis of the semantic analysis information 132 and delivers the first and second speech commands 32 and 34 to the integration module 140.

The user can input the first speech command 32 at the time when the start of the selected range of the text is output during speech synthesis. For example, when the user wants to select a sentence of the speech-synthesized text, the user can input the first speech command 32 through speech input of "start" when the start of the sentence is output, as illustrated in FIG. 9. Here, the speech recognition module 100 can recognize the speech input of the user as a word "start" and the speech interpretation module 120 can interpret the speech input as a command for designating the start of the selected range of the text according to the semantic analysis information 132.

In addition, the user can input the second speech command 34 through speech input of "end" when the end of the sentence is output. Here, the speech recognition module 100 can recognize the speech input of the user as a word "end" according to the grammar information 112 and the speech interpretation module 120 can interpret the same as a command for designating the end of the selected range of the text according to the semantic analysis information 132.

Upon input of the first and second speech commands 32 and 34 of the user to the controller 20 through the integration module 140, the controller 20 can specify the selected range 38 of the speech-synthesized text and control the graphic styling module 314 and the graphic rendering module 320 to display the selected range 38 of the text in a highlighting manner.

As shown in FIG. 10, the user can input a speech command 40 for repeating output of the selected range of the text as speech. The speech recognition module 100 can recognize the speech input of the user as a word "repeat" according to the grammar information 112 and the speech interpretation module 120 can interpret the speech input as a command for repeating output of the selected range of the text as speech according to the semantic analysis information 132.

The controller 20 controls the audio rendering module 316 and the audio output unit 330 to output the selected range of the text, specified by the first speech command 32 and the second speech command 34, according to the user command. Here, the user can input a third speech command 42 and a fourth speech command 44 for specifying the second selected range 41 included in the above-described selected range 38.

The user can input the third speech command 42 at time t3 when the start of the selected range 41 is output as speech during speech synthesis of the selected range 41. For example, when the user wants to select a portion including a plurality of words from the speech-synthesized text, the user can input the third speech command 42 through speech input of "start" at time t3 when the start of the portion is output, as shown in FIG. 11. Here, the speech recognition module 100 can receive the speech command 42 of the user and recognizes the same as a word "start" and the speech interpretation module 120 can interpret the speech command 42 as a command for designating the start of the second selected range 41 of the text.

The user can input the fourth speech command 44 through speech input of "end" at time t4 when the end of the portion is output. Here, the speech recognition module 100 can recognize the speech input of the user as a word "end" and the speech interpretation module 120 can interpret the speech input as a command for designating the end of the second selected range 41.

The input unit 10 receives an editing command for the selected range 41 of the text from the user and delivers the editing command to the controller 20 such that an editing function corresponding to the editing command is executed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A user interface method comprising:
    executing an application including a text:
    performing speech synthesis on the text included in the executed application and outputting the speech-synthesized text as speech, wherein a word or a phrase, which is determined according to an attribute of the executed application, included in the output speech-synthesized text is sequentially highlighted;
    receiving a first speech command indicating the start of a first selected range of the text from a user during outputting the speech-synthesized text;

receiving a second speech command indicating the end of the first selected range of the text from the user during outputting the speech-synthesized text;

specifying the first selected range according to the first speech command and the second speech command;

receiving an editing command for the selected range from the user;

receiving a third speech command for repeatedly outputting the specified first selected range;

receiving a fourth speech command indicating the start of a second selected range; and receiving a fifth speech command indicating the end of the second selected range, wherein the third speech command through the fifth speech command are received for re-specifying the second selected range within the specified first selected range after specifying the first selected range.

2. The user interface method according to claim 1, further comprising:

displaying the text on a screen; and sequentially highlighting words or sentences of the speech-synthesized text.

3. The user interface method according to claim 1, further comprising:

performing speech synthesis on the selected range of the text and outputting the selected range as speech; and specifying the second selected range according to the fourth speech command and the fifth speech command.

4. The user interface method according to claim 1, wherein the editing command corresponds to one of a copy command, a cut command, an edit command, a transmit command and a search command for the selected range of the text.

5. A user interface device comprising:

a speech rendering module for performing speech synthesis on a text;

an audio output unit for outputting synthesized speech data corresponding to the text processed by the speech rendering module;

a speech recognition module for recognizing a first speech command of a user for indicating the start of a first selected range of the text and a second speech command of the user for indicating the end of the first selected range during output of the synthesized speech data;

a speech interpretation module for interpreting the first speech command and the second speech command received from the speech recognition module; and a controller for executing an application including the text, specifying the first selected range according to the first speech command and the second speech command interpreted by the speech interpretation module, wherein a word or a phrase, which is determined according to an attribute of the executed application, included in the output speech-synthesized text is sequentially highlighted, wherein the speech recognition module further recognizes:

a third speech command for repeatedly outputting the specified first selected range, a fourth speech command indicating the start of a second selected range, and a fifth speech command indicating the end of the first second selected range, wherein the controller re-specifies the second selected range within the specified first selected range after specifying the first selected range in response to the third speech command through the fifth speech command.

6. The user interface device according to claim 5, further comprising a video output unit for displaying words or sentences of the speech-synthesized test by sequentially highlighting the same.

7. The user interface device according to claim 5, wherein the speech rendering module performs speech synthesis on the selected range of the text and outputs synthesized speech, and wherein the speech interpretation module interprets the third speech command to the fifth speech command.

8. The user interface device according to claim 5, wherein the speech recognition module recognizes an editing command for the selected range from the user, and wherein the editing command corresponds to one of a copy command, a cut command, an edit command, a transmit command and a search command for the selected range of the text.

* * * * *